United States Patent
Fang et al.

(10) Patent No.: US 11,799,513 B2
(45) Date of Patent: Oct. 24, 2023

(54) NON-COHERENT LONG-RANGE (LORA) COMMUNICATION SYSTEM BASED ON MULTIPLE-INPUT MULTIPLE-OUTPUT (MIMO) TECHNOLOGY

(71) Applicant: Guangdong University of Technology, Guangzhou (CN)

(72) Inventors: Yi Fang, Guangzhou (CN); Huan Ma, Guangzhou (CN); Yiwei Tao, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/154,789

(22) Filed: Jan. 13, 2023

(65) Prior Publication Data
US 2023/0155626 A1 May 18, 2023

(30) Foreign Application Priority Data
Feb. 23, 2022 (CN) .......................... 202210169872.5

(51) Int. Cl.
*H04B 1/69* (2011.01)
*H04B 7/0413* (2017.01)

(52) U.S. Cl.
CPC ............. *H04B 1/69* (2013.01); *H04B 7/0413* (2013.01); *H04B 2001/6912* (2013.01)

(58) Field of Classification Search
CPC . H04B 1/69; H04B 7/0413; H04B 2001/6912
See application file for complete search history.

(56) References Cited

U.S. PATENT DOCUMENTS

2005/0249306 A1* 11/2005 Chae .................... H04L 1/0643
375/267
2007/0260958 A1 11/2007 Li et al.

FOREIGN PATENT DOCUMENTS

| CN | 104935370 A | 9/2015 |
|---|---|---|
| CN | 107682058 A | 2/2018 |
| CN | 112954619 A | 6/2021 |
| CN | 113726713 A | 11/2021 |
| CN | 113810325 A | 12/2021 |
| CN | 113922850 A | 1/2022 |

(Continued)

*Primary Examiner* — Rahel Guarino

(57) ABSTRACT

A non-coherent long range (LoRa) communication system based on multiple-input multiple-output (MIMO) technology, including a transmitter and a receiver. The transmitter is configured to transmit signals to the receiver, and the receiver is configured to receive and demodulate the signals. The transmitter includes a bit-symbol converter, a space-time mapper, and a plurality of transmitting antennas. The space-time mapper is configured to select a transmit antenna for the signal in each transmission time slot and transmit a base Chirp signal $x_0$ and the modulating signal $x_m$ to the receiver in different time slots. The receiver includes a plurality of receiving antennas. The receiving antenna is configured to preprocess the signal to obtain a first cache matrix and a second cache matrix. After Hadamard product operation is performed on the first and second cache matrixes, operation results of the receiving antennas are accumulated and demodulated to output demodulated information bits.

4 Claims, 6 Drawing Sheets

(56) References Cited

FOREIGN PATENT DOCUMENTS

WO 2006091620 A2 8/2006
WO 2020151380 A1 7/2020

* cited by examiner

NON-COHERENT LONG-RANGE (LORA) COMMUNICATION SYSTEM BASED ON MULTIPLE-INPUT MULTIPLE-OUTPUT (MIMO) TECHNOLOGY

CROSS-REFERENCE TO RELATED APPLICATIONS

This application claims the benefit of priority from Chinese Patent Application No. 202210169872.5, filed on Feb. 23, 2022. The content of the aforementioned application, including any intervening amendments thereto, is incorporated herein by reference in its entirety.

TECHNICAL FIELD

This application relates to long-range (LoRa) communication systems, and more particularly to a non-coherent LoRa communication system based on multiple-input multiple-output (MIMO) technology.

BACKGROUND

Nowadays, the Internet of Things (IoT) has attracted extensive attention in industry and academia. Compared with previous communication solutions, the IoT solutions are characterized by wide network coverage, low energy consumption of terminals devices, and low equipment cost. Accordingly, Low Power Wide Area Network (LPWAN) technologies have emerged, among which Long Range Wide Area Network (LoRaWAN) with the highest IoT deployment freedom is predominant.

As the physical layer technology for the LoRaWAN, LoRa modulation inherently has various characteristics of chirp spread spectrum (CSS) modulation, such as anti-interference, anti-fading performance, and anti-Doppler effect, and its performance has attracted considerable academic attention. Single-input-single-output (SISO) communication system is a non-coherent communication system, in which neither the transmitter nor the receiver requires channel information. The existing SISO-LoRa communication systems have poor a bit error rate under a Rayleigh fading channel, and are thus not suitable for the long-range transmission. Since the signal transmission is affected by signal fading and interference in the environment in actual use, the transmission performance of the existing SISO-LoRa communication system suffers deterioration, resulting in lower bit error rate performance and narrowed coverage range.

Recently, a wireless transceiver has been proposed, which includes a data acquisition module, a microcontroller, a signal transceiving and processing module, and a wireless transceiving module, where the data acquisition module is used to collect data signals from a sensor; the microcontroller is connected to the data acquisition module and the signal transceiving and processing module; the microcontroller is configured to control and receive the data signals of the sensor collected by the data acquisition module according to the control signals output by the signal transceiver processing module, and process and output the data signals to the signal transceiving and processing module; the signal transceiving and processing module is connected to the wireless transceiving module, and is configured to receive control command signals through the wireless transceiving module, output the control command signals to the microcontroller after LoRa demodulation, and control and receive the data signals collected by the data acquisition module through the microcontroller; and the signal transceiving and processing module is also used to perform LoRa modulation on the received data signals and transmit them through the wireless transceiving module. Compared with the traditional wireless data uploading methods, this wireless transceiver does not need the network provided by the Internet service provider, allowing for reduced cost. However, this method still suffers from signal attenuation and interference, and is thus not applicable to the long-range transmission.

SUMMARY

An object of the present disclosure is to provide a non-coherent long range (LoRa) communication system based on multiple-input multiple-output (MIMO) technology, which has enhanced bit error performance and enlarged coverage area.

Technical solutions of the present disclosure are described as follows.

The present disclosure provides a non-coherent long range (LoRa) communication system based on multiple-input multiple-output (MIMO) technology, comprising:
a transmitter; and
a receiver;
wherein the transmitter is configured to transmit a signal to the receiver, and the receiver is configured to receive and demodulate the signal;
the transmitter comprises a bit-symbol converter, a space-time mapper, and a plurality of transmitting antennas; the bit-symbol converter is configured to convert a bit stream into a modulating signal $x_m$; the space-time mapper is configured to select a transmitting antenna from the plurality of transmitting antennas for the signal within each transmission time slot and transmit a base Chirp signal $x_0$ and the modulating signal $x_m$ to the receiver in different time slots;
the receiver comprises a plurality of receiving antennas; each of the plurality of receiving antennas is configured to preprocess the signal transmitted from the transmitter to obtain a first cache matrix and a second cache matrix, and perform Hadamard product operation on the first cache matrix and the second cache matrix; and operation results of the plurality of receiving antennas are accumulated and demodulated, and a demodulated information bit is output;
the bit stream is input to the bit-symbol converter to be converted into decimal symbols; a spreading factor of the non-coherent LoRa communication system is defined as SF; the spreading factor determines a size of the decimal symbols into which the bit stream is split; one LoRa symbol contains SF bits; and the number of modulable symbols is also determined by the spreading factor SF, and is $2^{SF}$;
the base Chirp signal $x_0$ is expressed as:

$$x_0(n) = \sqrt{\frac{1}{2^{SF}}} \exp\left[j2\pi \cdot \frac{n^2}{2^{SF+1}}\right];$$

the modulating signal $x_m$ is expressed as:

$$x_m(n) = \sqrt{\frac{1}{2^{SF}}} \exp\left[j2\pi \cdot \frac{((n+m) \bmod 2^{SF})^2}{2^{SF+1}}\right];$$

the space-time mapper is operated through steps of:
respectively selecting the plurality of transmitting antennas to transmit the base Chirp signal $x_0$ in $1^{st}$ to $N^{th}$ time slots; and in $N+1^{th}$ to $2N^{th}$ time slots, respectively selecting the plurality of transmitting antennas to transmit the modulating signal $x_m$, wherein N is the number of the plurality of transmitting antennas;

the first cache matrix and the second cache matrix are obtained through steps of:
storing $(M-1)\cdot 2^{SF}+1^{th}$ to $M\cdot 2^{SF\ th}$ sampling points into the first cache matrix $B_{M,1}$; and storing $(2M-1)\cdot 2^{SF}+1^{th}$ to $2M\cdot 2^{SF\ th}$ sample points into the second cache matrix $B_{M,2}$, wherein M represents the number of the plurality of receiving antennas;

the receiver further comprises a Fourier transformer; the Fourier transformer is a $2^{SF}$-point Fourier transformer; the operation results of the plurality of receiving antennas are accumulated to obtain the demodulated signal, and then the demodulated signal is input to the Fourier transformer for Fourier transformation;

the demodulated signal is subjected to $2^{SF}$-point discrete Fourier transformation with to obtain discrete Fourier transform results $$d = \frac{|h|\sqrt{P}}{2^{SF}} \exp\left(\frac{j2\pi m^2}{2^{SF+1}} + j\varphi_h\right) \sum_{n=0}^{2^{SF}-1} \exp\left(\frac{j\pi(m-k)n}{2^{SF-1}}\right) + Z(k)$$

containing $2^{SF}$ values;

real parts of the discrete Fourier transform result are removed, and then an index $\tilde{m}$ of a maximum value is selected, expressed as:

$$\tilde{m} = \arg\max_{k \in M}(|d_m(k)|); \text{ and}$$

the receiver further comprises a symbol-bit converter; and an input of the symbol-bit converter is a selected index, and an output of the symbol-bit converter is the demodulated information bit.

In some embodiments, the transmitter is operated as follows:
letting a symbol generated from SF bits through the bit-symbol converter be represented by $s_m$; and performing a time-cyclic shift on the base Chirp signal $x_0$ according to a magnitude of the $s_m$ to obtain the modulating signal $x_m$; and
inputting the base Chirp signal $x_0$ and the modulating signal $x_m$ into the space-time mapper; and selecting, by the space-time mapper, a transmitting antenna from the plurality of transmitting antennas to transmit the signal to the receiver.

In some embodiments, the transmitter further comprises a radio frequency (RF) link; and the space-time mapper is connected to the plurality of transmitting antennas through the RF link.

In some embodiments, the transmitter further comprises a single-pole multi-throw switch; and the RF link is connected to the plurality of transmitting antennas through the single-pole multi-throw switch.

Compared to the prior art, the present disclosure has the following beneficial effects.

The MIMO-based non-coherent LoRa communication system provided herein can effectively enhance the reliability of information transmission and expand the coverage of effective network transmission. Moreover, the improved diversity brought by multiple transmitting antennas and multiple receiving antennas can improve the bit error performance of the LoRa communication system. This system has reduced energy consumption while ensuring the bit error performance.

DETAILED DESCRIPTION OF EMBODIMENTS

Figure 1:
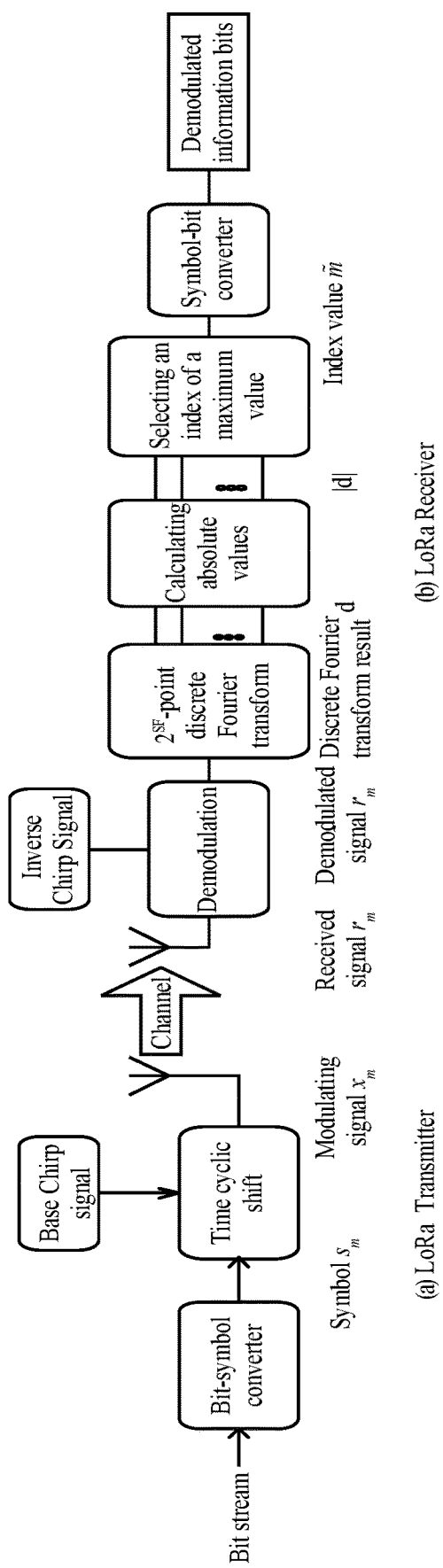
FIG. 1 is a block diagram of a single-input-single-output (SISO) long-range (LoRa) communication system according to an embodiment of the present disclosure.

The accompanying drawings are merely for exemplary illustration, and are not intended to limit the present disclosure.

To better illustrate the embodiments, some parts may be omitted, zoomed in, or zoomed out in the accompanying drawings, and the dimension in the drawings do not represent the actual dimension.

It is understandable to those skilled in the art that some well-known structures in the accompanying drawings and their descriptions may be omitted.

The technical solutions of the present disclosure will be further described with reference to the accompanying drawings and embodiments.

Embodiment 1

Provided herein is a single-input-single-output (SISO) long-range (LoRa) communication system. As shown in FIG. 1, the SISO-LoRa communication system includes a transmitter, which works as follows. A bit stream carrying data information is input to the transmitter, and the bits are imported to the bit-symbol converter to be converted into decimal symbols. Here, the LoRa spreading factor is defined as SF, which is an integer and is selected according to different regional standards, generally SF∈ {6, 7, 8, 9, ..., 12}. The spreading factor determines the size of symbols that is obtained by dividing the bit stream. One LoRa symbol contains SF bits. The number of modulable symbols is also determined by the spreading factor SF, and a total number of modulable symbols is $2^{SF}$. Letting a symbol generated from SF bits through the bit-symbol converter be represented by $s_m$, the base Chirp signal $$x_0(n) = \sqrt{\frac{1}{2^{SF}}} \exp\left[j2\pi \cdot \frac{n^2}{2^{SF+1}}\right]$$

is time-cyclically shifted by the magnitude of $s_m$ to obtain the modulating signal $$x_m(n) = \sqrt{\frac{1}{2^{SF}}} \exp\left[j2\pi \cdot \frac{((n+m) \bmod 2^{SF})^2}{2^{SF+1}}\right],$$

which will be transmitted through the antenna.

The SISO-LoRa communication system also includes a receiver (b), which works as follows. The received signal $r_m$ arrives at the receiver through the antenna channel, and is multiplied with the inverse Chirp signal $x^*_0(n)$ for demodulation, so as to obtain a demodulated signal $\tilde{r}_m(n)=r_m(n) \times x^*_0(n)$, where the asterisk represents the conjugation of the signal. The demodulated signal is subjected to $2^{SF}$-point discrete Fourier transformation to obtain the discrete Fourier transform result $$d = \frac{|h|\sqrt{P}}{2^{SF}} \exp\left(\frac{j2\pi m^2}{2^{SF+1}} + j\varphi_h\right) \sum_{n=0}^{2^{SF}-1} \exp\left(\frac{j\pi(m-k)n}{2^{SF-1}}\right) + Z(k)$$

containing $2^{SF}$ values. By taking the absolute value of these values and selecting an index $\tilde{m}$ of a maximum value, the index $$\tilde{m} = \underset{k \in M}{\operatorname{argmax}}(|d_m(k)|)$$

is obtained. By importing the index into the symbol-bit converter, the demodulated information bit is obtained.

Embodiment 2

Figure 2:
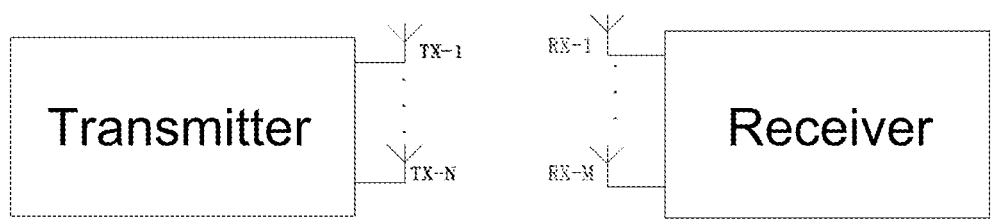
FIG. 2 schematically shows a multiple-input multiple-output (MIMO)-based non-coherent LoRa communication system according to an embodiment of the present disclosure.
Figure 3:
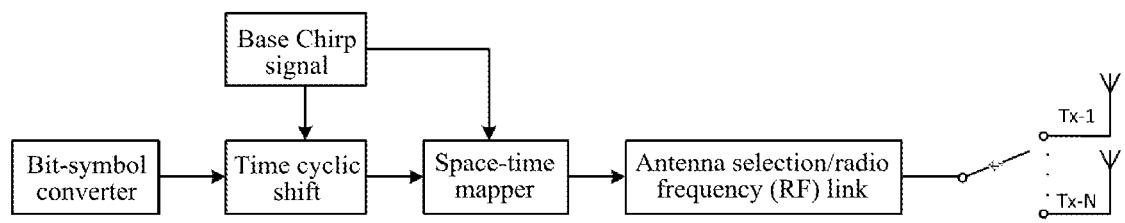
FIG. 3 schematically shows a transmitter model of the MIMO-based non-coherent LoRa communication system according to an embodiment of the present disclosure.
Figure 4:
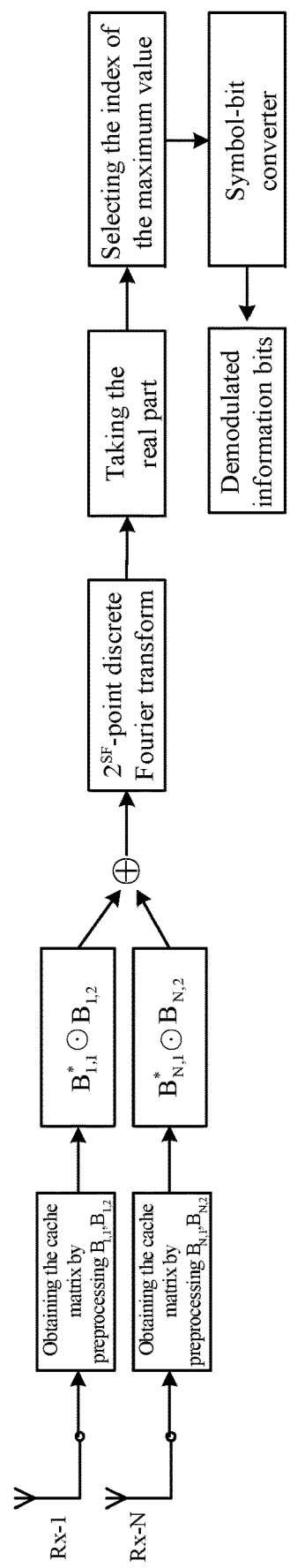
FIG. 4 schematically shows a receiver model of the MIMO-based non-coherent LoRa communication system according to an embodiment of the present disclosure.

Provided herein is a non-coherent long-range (LoRa) communication system based on multiple-input multiple-output (MIMO) technology. As shown in FIGS. 2-4, the non-coherent LoRa communication system includes a transmitter and a receiver. The transmitter is configured to transmit a signal to the receiver, and the receiver is configured to receive and demodulate the signal.

The transmitter includes a bit-symbol converter, a space-time mapper, and a plurality of transmitting antennas. The bit-symbol converter is configured to convert the bit stream into a modulating signal $x_m$. The space-time mapper is configured to select a transmitting antenna from the plurality of transmitting antennas for the signal within each transmission time slot and transmit the base Chirp signal $x_0$ and the modulating signal $x_m$ to the receiver in different time slots.

The receiver includes a plurality of receiving antennas. Each receiving antenna preprocesses the signal transmitted from the transmitter to obtain a first cache matrix and a second cache matrix. After performing Hadamard product operation on the first cache matrix and the second cache matrix, the operation results of all receiving antennas are accumulated and demodulated, and a demodulated information bit is output.

The transmitter is operated through the following steps.

A symbol generated from SF bits through the bit-symbol converter is represented by $s_m$. The base Chirp signal $x_0$ is time-cyclically shifted according to the magnitude of the $s_m$ to obtain the modulating signal $x_m$.

The base Chirp signal $x_0$ and the modulated signal $x_m$ are input into the space-time mapper. The space-time mapper selects a transmitting antenna to transmit the signal to the receiver.

The transmitter further includes a radio frequency (RF) link. The space-time mapper is connected to the transmitting antenna through the RF link.

The base Chirp signal $x_0$ is expressed as:

$$x_0(n) = \sqrt{\frac{1}{2^{SF}}} \exp\left[j2\pi \cdot \frac{n^2}{2^{SF+1}}\right].$$

The modulating signal $x_m$ is expressed as:

$$x_m(n) = \sqrt{\frac{1}{2^{SF}}} \exp\left[j2\pi \cdot \frac{((n+m) \bmod 2^{SF})^2}{2^{SF+1}}\right].$$

The transmitter further includes a single-pole multi-throw switch. The RF link is connected to the plurality of transmitting antennas through the single-pole multi-throw switch.

The space-time mapper is configured to select a transmit antennas from the plurality of transmitting antennas for the signal within each transmission time slot and transmit a base Chirp signal $x_0$ and the modulating signal $x_m$ to the receiver in different time slots. The space-time mapper is operated through the following steps.

The plurality of transmitting antennas are respectively selected to transmit the base Chirp signal $x_0$ in $1^{st}$ to $N^{th}$ time slots. In N+$1^{th}$ to $2N^{th}$ time slots, the plurality of transmitting antennas are respectively selected to transmit the modulating signal $x_m$, where N is the number of the plurality of transmitting antennas.

The role of the space-time mapper is to select a transmitting antenna from the plurality of transmitting antennas for the signal within each transmission time slot. In the transmitter of a non-coherent LoRa communication system, only one RF link is required for the N transmit antennas, and the RF link is connected to the transmit antenna via a single-pole multi-throw switch. The space-time mapping rule for the non-coherent LoRa communication system with N transmitting antennas is described as follows. The plurality of transmitting antennas are respectively selected to transmit the base Chirp signal $x_0$ within a $1^{st}$ time slots, and the plurality of transmitting antennas are respectively selected to transmit the base Chirp signal $x_0$ within a $N^{th}$ time slot. In N+$1^{th}$ to $2N^{th}$ time slots, the plurality of transmitting antennas are respectively selected to transmit the modulating signal $x_m$, where N is the number of the plurality of transmitting antennas.

The receiving antenna preprocesses the signal sent by the transmitter to obtain a first cache matrix and a second cache matrix.

Specifically, the $(M-1)\cdot 2^{SF}+1$ to $M\cdot 2^{SF}$ sample points are stored into the first cache matrix $B_{M,1}$. The $(2M-1)\cdot 2^{SF}+1$ to $2M\cdot 2^{SF}$ sample points are stored into the second cache matrix $B_{M,2}$, where M represents the number of receiving antennas.

The receiver further includes a Fourier transformer, which is a $2^{SF}$-point Fourier transformer. The operation results of all the receiving antennas are accumulated and then input to the Fourier transformer for Fourier transformation.

Real parts of the discrete Fourier transform result are removed, and then an index of the maximum value will be selected.

The receiver further includes a symbol-bit converter. The input of the symbol-bit converter is the selected index, and the output of the symbol-bit converter is the demodulated information bit.

In the receiver of the non-coherent LoRa communication system, each receiving antenna needs to sample and preprocess the received signal. For the $M^{th}$ receiver antenna, the preprocessing process is as follows: the $(M-1)\cdot 2^{SF}+1$ to $M\cdot 2^{SF}$ sample points are stored in the first cache matrix $B_{M,1}$. The $(2M-1)\cdot 2^{SF}+1$ to $2M\cdot 2^{SF}$ sample points are stored in the second cache matrix $B_{M,2}$. Hadamard product operation $B^*_{M,1}\odot B_{M,2}$ is performed, where $\odot$ is the Hadamard product symbol. After that, the operation results of all received antennas are accumulated to obtain the demodulated signal, which is then input into the $2^{SF}$-point Fourier transformer. After completing the Fourier transformation, the real parts of the discrete Fourier transform result are removed, and then an index $\tilde{m}$ of a maximum value is selected. The index is subjected to a symbol-bit conversion to output the demodulated information bit.

Embodiment 3

This embodiment is implemented based on Embodiment 2.

Figure 5:
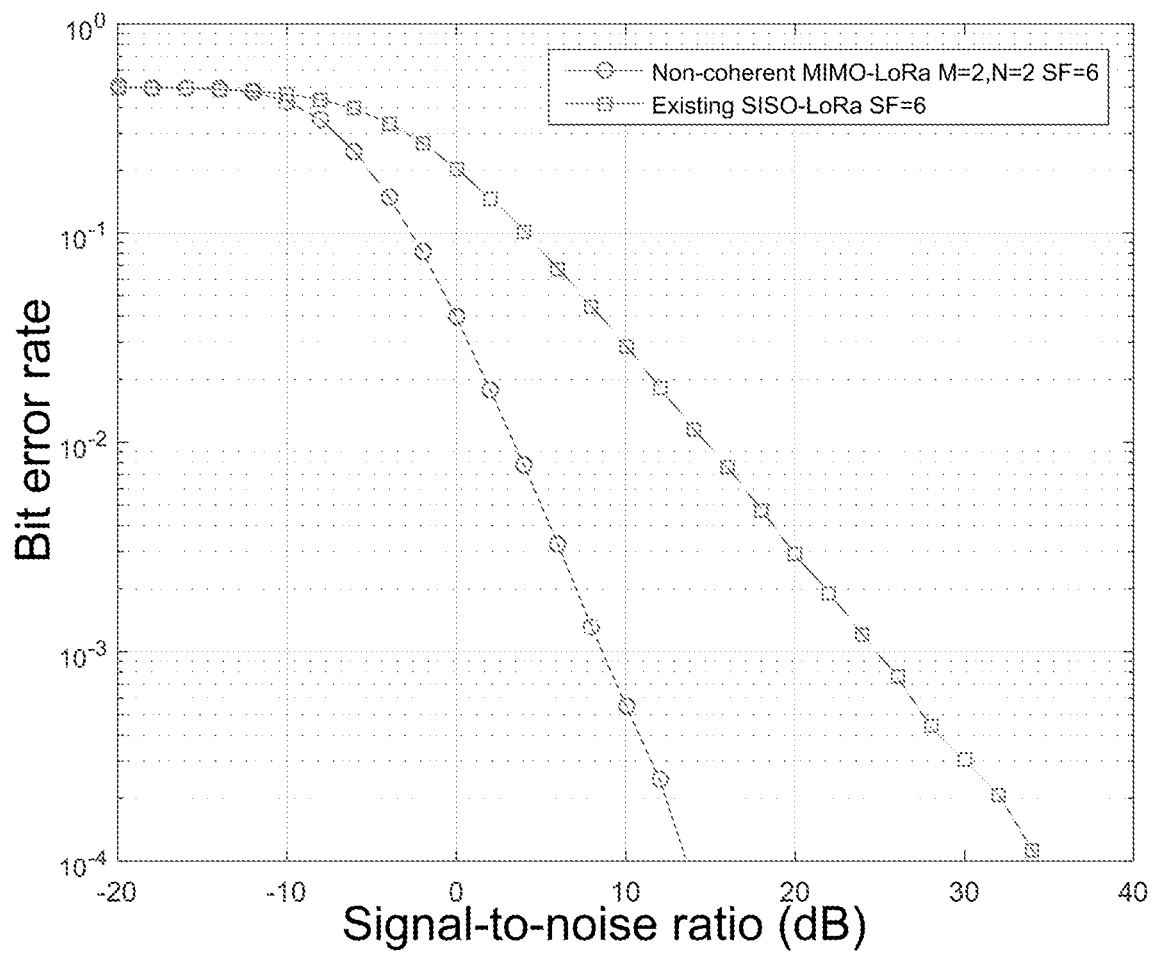
FIG. 5 schematically shows performance comparison between an existing LoRa communication system and the MIMO-based non-coherent LoRa communication system (N=2, M=2, and SF=6) according to an embodiment of the present disclosure in the Rayleigh channel.

FIG. 5 schematically shows a comparison on the bit rate performance of the existing LoRa communication system and the MIMO-based non-coherent LoRa communication system provided herein under the Rayleigh channel environment (SF=6). The MIMO-based non-coherent LoRa communication system provided herein has a gain of more than 22 dB over the existing SISO-LoRa system at the bit error rate of $10^{-4}$.

Figure 6:
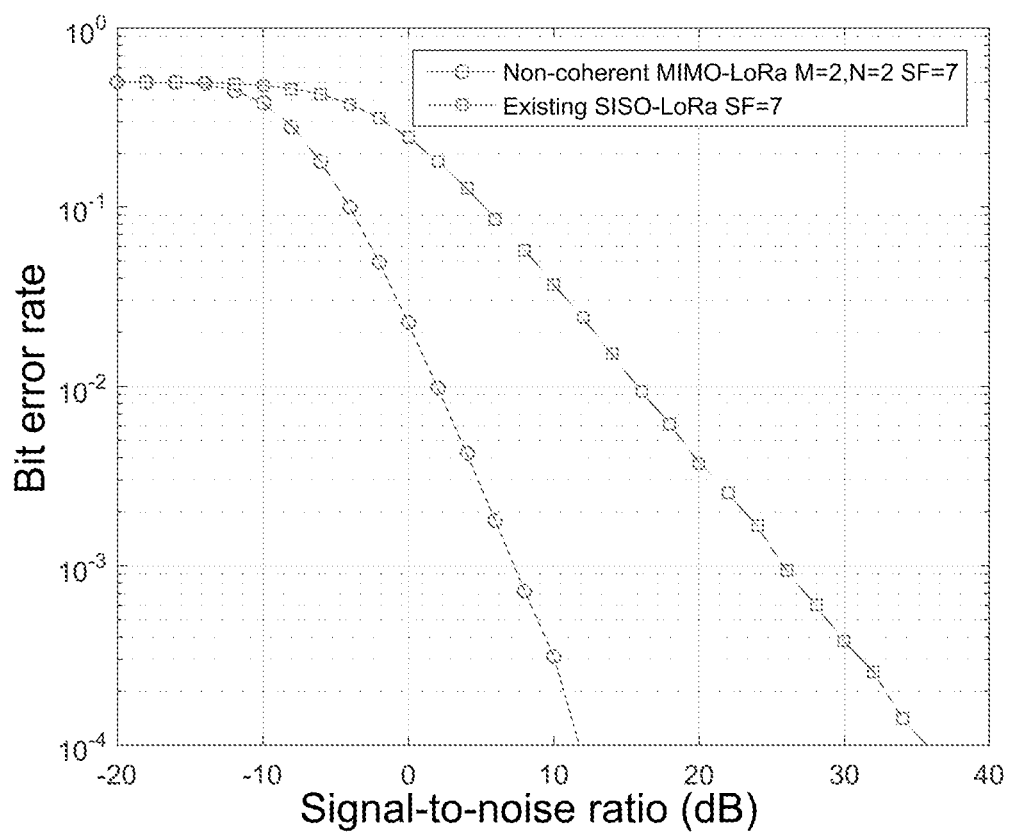
FIG. 6 schematically shows performance comparison between the existing LoRa communication system and the MIMO-based non-coherent LoRa communication system (N=2, M=2, and SF=7) according to an embodiment of the present disclosure in the Rayleigh channel.

FIG. 6 schematically shows a comparison on the bit rate performance of the existing LoRa communication system and the MIMO-based non-coherent LoRa communication system provided herein under the Rayleigh channel environment (SF=7). The MIMO-based non-coherent LoRa communication system provided herein has a gain of more than 20 dB over the existing SISO-LoRa system at the bit error rate of $10^{-4}$.

Figure 7:
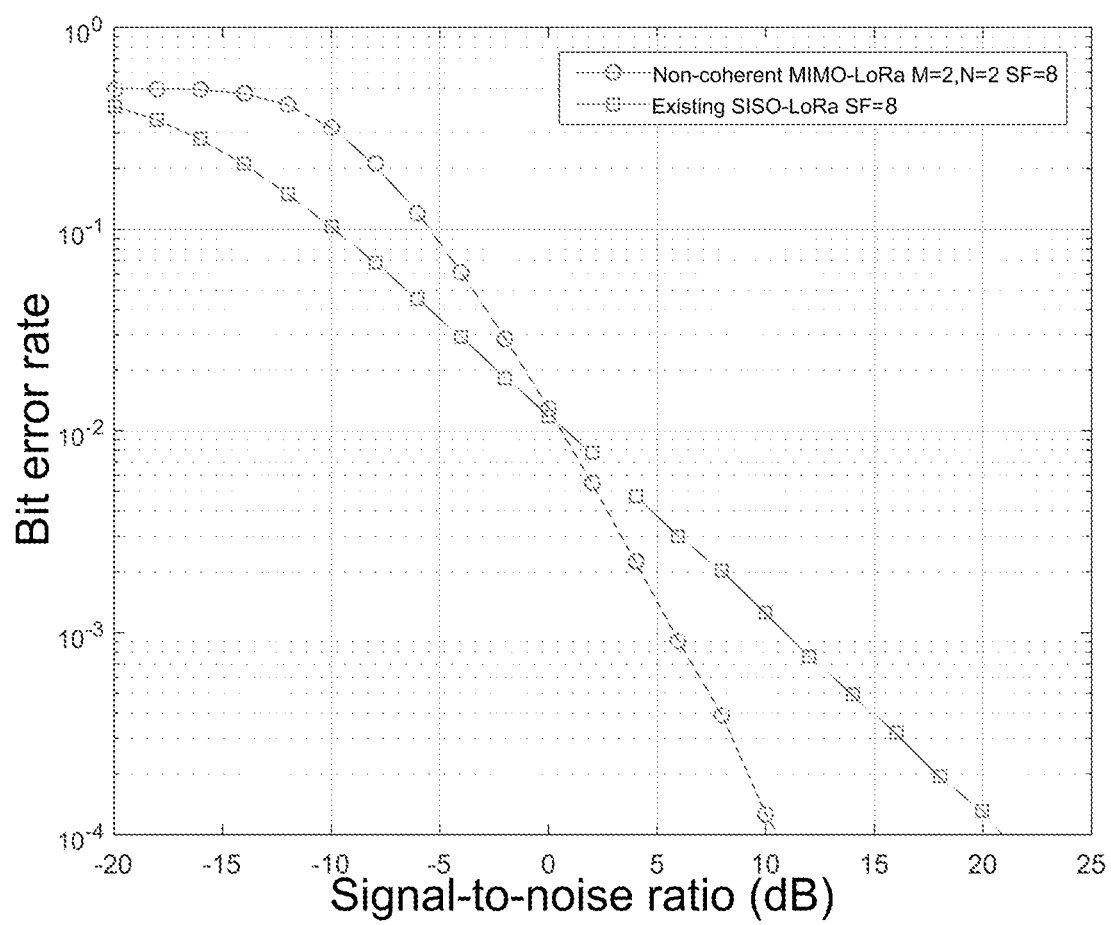
FIG. 7 schematically shows performance comparison between the existing LoRa communication system and the MIMO-based non-coherent LoRa communication system (N=2, M=2, and SF=8) according to an embodiment of the present disclosure in the Rayleigh channel.

FIG. 7 schematically shows a comparison on the bit rate performance of the existing LoRa communication system and the MIMO-based non-coherent LoRa communication system provided herein under the Rayleigh channel environment (SF=8). The MIMO-based non-coherent LoRa communication system provided herein has a gain of more than 10 dB over the existing SISO-LoRa system at the bit error rate of $10^{-4}$.

As can be seen from FIGS. 5-7, the performance of the MIMO-based non-coherent LoRa communication system provided herein is highly enhanced compared with the existing SISO-LoRa communication system regarding the bit error rate. It can also be seen from FIGS. 4-6 that the MIMO-based non-coherent LoRa communication system consumes less energy than the existing SISO-LoRa communication system in achieving the same bit error rate performance.

Identical or similar reference signs correspond to identical or similar components throughout the drawings.

The positional terms are merely used for exemplary illustration of the positional or orientational relationships presented in the accompanying drawings, and should not be construed as limitations to the present disclosure.

Obviously, these embodiments are merely intended to clearly illustrate the present disclosure, and are not intended to limit the implementation of the present disclosure. Though the disclosure has been described in detail above, other variations and modifications can still be made by one of ordinary skill in the art on the basis of the above description. It should be understood that those variations and modifications made by those skilled in the art based on the content disclosed herein without paying creative effort should still fall within the scope of the present disclosure defined by the appended claims.

What is claimed is:

1. A non-coherent long-range (LoRa) communication system based on multiple-input multiple-output (MIMO) technology, comprising:
    a transmitter; and
    a receiver;
    wherein the transmitter is configured to transmit a signal to the receiver, and the receiver is configured to receive and demodulate the signal;
    the transmitter comprises a bit-symbol converter, a space-time mapper, and a plurality of transmitting antennas; the bit-symbol converter is configured to convert a bit stream into a modulating signal $x_m$; the space-time mapper is configured to select a transmitting antenna from the plurality of transmitting antennas for the signal within each transmission time slot and transmit a base Chirp signal $x_0$ and the modulating signal $x_m$ to the receiver in different time slots;
    the receiver comprises a plurality of receiving antennas; each of the plurality of receiving antennas is configured to preprocess the signal transmitted from the transmitter to obtain a first cache matrix and a second cache matrix, and perform Hadamard product operation on the first cache matrix and the second cache matrix; and operation results of the plurality of receiving antennas are accumulated and demodulated to obtain a demodulated signal, and a demodulated information bit is output;
    the bit stream is input to the bit-symbol converter to be converted into decimal symbols; a spreading factor of the non-coherent LoRa communication system is defined as SF; the spreading factor determines a size of the decimal symbols into which the bit stream is split; one LoRa signal contains SF bits; and a number of modulable symbols is also determined by the spreading factor SF, and is $2^{SF}$;
    the base Chirp signal $x_0$ is expressed as:

$$x_0(n) = \sqrt{\frac{1}{2^{SF}}} \exp\left[j2\pi \cdot \frac{n^2}{2^{SF+1}}\right];$$

the modulating signal $x_m$ is expressed as:

$$x_m(n) = \sqrt{\frac{1}{2^{SF}}} \exp\left[j2\pi \cdot \frac{((n+m) \bmod 2^{SF})^2}{2^{SF+1}}\right];$$

the space-time mapper is operated through steps of:
  respectively selecting the plurality of transmitting antennas to transmit the base Chirp signal $x_0$ in $1^{st}$ to $N^{th}$ time slots; and in $N+1^{th}$ to $2N^{th}$ time slots, respectively selecting the plurality of transmitting antennas to transmit the modulating signal $x_m$, wherein N is a number of the plurality of transmitting antennas;
the first cache matrix and the second cache matrix are obtained through steps of:
  storing $(M-1) \cdot 2^{SF}+1^{th}$ to $M \cdot 2^{SF\ th}$ sampling points into the first cache matrix $B_{M,1}$; and storing $(2M-1) \cdot 2^{SF}+1^{th}$ to $2M \cdot 2^{SF\ th}$ sample points into the second cache matrix $B_{M,2}$ wherein M represents a number of the plurality of receiving antennas;
the receiver further comprises a Fourier transformer; the Fourier transformer is a $2^{SF}$-point Fourier transformer; the operation results of the plurality of receiving antennas are accumulated to obtain the demodulated signal, and then the demodulated signal is input to the Fourier transformer for Fourier transformation;
the demodulated signal is subjected to $2^{SF}$-point discrete Fourier transformation with to obtain discrete Fourier transform result $$d = \frac{|h|\sqrt{P}}{2^{SF}} \exp\left(\frac{j2\pi m^2}{2^{SF+1}} + j\varphi_h\right) \sum_{n=0}^{2^{SF}-1} \exp\left(\frac{j\pi(m-k)n}{2^{SF-1}}\right) + Z(k)$$

containing $2^{SF}$ values; wherein k is an integer; Z(k) is a complex additive white Gaussian noise (AWGN); P is a transmitting power; and h is a complex envelope amplitude;
  real parts of the discrete Fourier transform result are removed, and then an index $\tilde{m}$ of a maximum value is selected, expressed as:

$$\tilde{m} = \arg\max_{k \in M}(|d_m(k)|); \text{ and}$$

the receiver further comprises a symbol-bit converter; and an input of the symbol-bit converter is a selected index, and an output of the symbol-bit converter is the demodulated information bit.

2. The non-coherent LoRa communication system of claim 1, wherein the transmitter is operated as follows:
  letting a symbol generated from SF bits through the bit-symbol converter be represented by $s_m$; and performing a time-cyclic shift on the base Chirp signal $x_0$ according to a magnitude of the $s_m$ to obtain the modulating signal $x_m$; and
  inputting the base Chirp signal $x_0$ and the modulating signal $x_m$ into the space-time mapper; and selecting, by the space-time mapper, the transmitting antenna from the plurality of transmitting antennas to transmit the signal to the receiver.

3. The non-coherent LoRa communication system of claim 2, wherein the transmitter further comprises a radio frequency (RF) link; and the space-time mapper is connected to a selected transmitting antenna through the RF link.

4. The non-coherent LoRa communication system of claim 3, wherein the transmitter further comprises a single-pole multi-throw switch; and the RF link is connected to the plurality of transmitting antennas through the single-pole multi-throw switch.

* * * * *